(12) United States Patent
Mukhopadhyay et al.

(10) Patent No.: US 9,197,789 B2
(45) Date of Patent: Nov. 24, 2015

(54) METHOD AND SYSTEM FOR REMOVAL OF FOG, MIST, OR HAZE FROM IMAGES AND VIDEOS

(75) Inventors: Sudipta Mukhopadhyay, Kharagpur (IN); Abhishek Kumar Tripathi, Kharagpur (IN)

(73) Assignee: Indian Institute of Technology, Kharagpur, West Bengal, Kharagpur (IN)

( * ) Notice: Subject to any disclaimer, the term of this patent is extended or adjusted under 35 U.S.C. 154(b) by 0 days.

(21) Appl. No.: 14/233,968

(22) PCT Filed: Feb. 2, 2012

(86) PCT No.: PCT/IN2012/000077
§ 371 (c)(1),
(2), (4) Date: Jan. 21, 2014

(87) PCT Pub. No.: WO2013/018101
PCT Pub. Date: Feb. 7, 2013

(65) Prior Publication Data
US 2014/0140619 A1    May 22, 2014

(30) Foreign Application Priority Data
Aug. 3, 2011   (IN) .............................. 1029/KOL/2011

(51) Int. Cl.
*G06K 9/00* (2006.01)
*H04N 1/60* (2006.01)
(Continued)

(52) U.S. Cl.
CPC .............. *H04N 1/6027* (2013.01); *G06T 5/002* (2013.01); *G06T 5/009* (2013.01); *G06T 5/40* (2013.01); *G06K 9/00* (2013.01); *G06T 2207/10004* (2013.01); *G06T 2207/10016* (2013.01);
(Continued)

(58) Field of Classification Search
USPC ......... 382/100, 103, 104, 168, 254, 255, 260, 382/263, 264, 266, 274
See application file for complete search history.

(56) References Cited

U.S. PATENT DOCUMENTS

| | | | | |
|---|---|---|---|---|
| 5,867,166 | A * | 2/1999 | Myhrvold et al. | 345/419 |
| 6,377,229 | B1 * | 4/2002 | Sullivan | 345/6 |
| 7,042,602 | B1 * | 5/2006 | Yang et al. | 358/518 |

(Continued)

OTHER PUBLICATIONS

K. Garg and S. K. Nayar; "Vision and Rain", International Journal of Computer Vision, vol. 75, No. 1, pp. 3-27, Oct. 1, 2007.
(Continued)

*Primary Examiner* — Vu Le
*Assistant Examiner* — Aklilu Woldemariam
(74) *Attorney, Agent, or Firm* — D'Ambrosio & Menon, PLLC; Usha Menon

(57) ABSTRACT

A method of removing fog from the images/videos independent of the density or amount of the fog and free of user intervention and a system for carrying out such method of fog removal from images/videos are disclosed. The removal of fog from images and video involve airlight estimation and airlight map refinement based restoration of foggy images and videos. Advantageously, removal of fog from images and videos of this invention would require less execution time and yet achieve high perceptual image quality with reduced noise and enhanced contrast. The proposed method is adapted for RGB Color model and advantageously also for HSI color model involving reduced computational requirements and be user friendly and supposed to have wide application and use.

11 Claims, 6 Drawing Sheets

Figure 1:
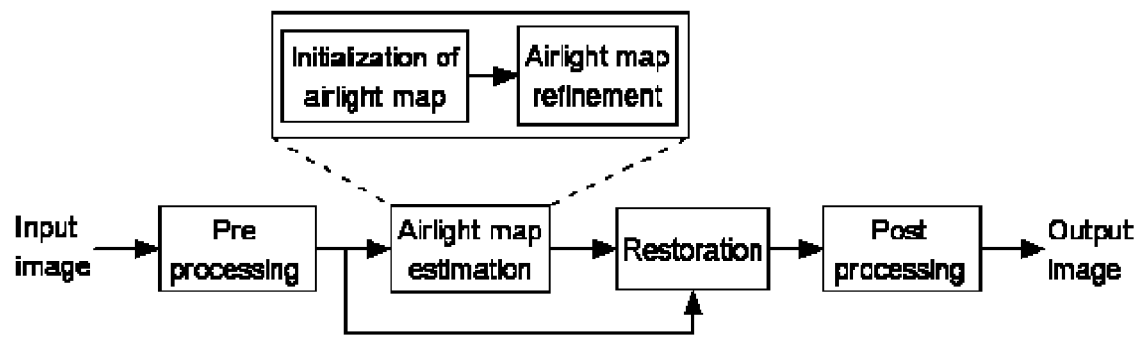

(51) Int. Cl.
 G06T 5/40 (2006.01)
 G06T 5/00 (2006.01)
(52) U.S. Cl.
 CPC ............... G06T2207/20012 (2013.01); G06T 2207/20028 (2013.01); G06T 2207/20192 (2013.01)

(56) References Cited

U.S. PATENT DOCUMENTS

| | | | |
|---|---|---|---|
| 8,023,730 B2* | 9/2011 | Holm et al. | 382/168 |
| 8,396,324 B2* | 3/2013 | Kang et al. | 382/275 |
| 2002/0163482 A1* | 11/2002 | Sullivan | 345/6 |
| 2004/0183812 A1* | 9/2004 | Raskar et al. | 345/582 |
| 2007/0024620 A1* | 2/2007 | Muller-Fischer et al. | 345/427 |
| 2007/0098288 A1* | 5/2007 | Raskar et al. | 382/254 |
| 2008/0101674 A1* | 5/2008 | Begelman et al. | 382/130 |
| 2008/0170754 A1* | 7/2008 | Kawasaki | 382/104 |
| 2008/0304695 A1* | 12/2008 | Holm et al. | 382/100 |
| 2009/0278961 A1* | 11/2009 | Mohanty et al. | 348/241 |
| 2010/0040300 A1* | 2/2010 | Kang et al. | 382/255 |
| 2010/0272340 A1* | 10/2010 | Bar-Aviv et al. | 382/131 |
| 2010/0322478 A1 | 12/2010 | Nitanda | |
| 2011/0135200 A1* | 6/2011 | Chen et al. | 382/167 |
| 2012/0120054 A1* | 5/2012 | Sandrew et al. | 345/419 |
| 2012/0213436 A1* | 8/2012 | Grindstaff et al. | 382/167 |
| 2014/0140619 A1* | 5/2014 | Mukhopadhyay et al. | 382/167 |
| 2014/0177960 A1* | 6/2014 | Park et al. | 382/167 |
| 2014/0205192 A1* | 7/2014 | Wang | 382/167 |

OTHER PUBLICATIONS

Y.Y. Schechner, S.G. Narasimhan, and S.K. Nayar; "Instant dehazing of images using polarization;" IEEE Computer Society Conference on Computer Vision and Pattern Recognition, pp. 325-332 2001.

R. Fattal; "Single image dehazing", International Conference on Computer Graphics and Interactive Techniques archive ACM SIGGRAPH, pp. 1-9, 2008.

R. T. Tan; "Visibility in bad weather from a single image", IEEE conference on Computer Vision and Pattern Recognition, pp. 1-8, 2008.

J. Kopf, B. Neubert, B. Chen, M. Cohen, D. Cohen-Or, O. Deussen, M. Uyttendaele, and D. Lischinski; "Deep photo: Model-based photograph enhancement and viewing", ACM Transactions on Graphics, vol. 27, No. 5, pp. 116:1-116:10; 2008.

K. He, J. Sun, and X. Tang; "Single image haze removal using dark channel prior" IEEE International Conference on Computer Vision and Pattern Recognition, pp. 1956-1963, 2009.

J. P. Tarel and N. Hautiere; "Fast visibility restoration from a single color or gray level image", IEEE International Conference on Computer Vision, pp. 2201-2208; 2009.

Ran Kaftory et al: "Variational Distance-Dependent Image Restoration" CVPR '07. IEEE Conference on Computer Vision and Pattern Recognition; Jun. 18-23, 2007; Minneapolis, MN, USA, IEEE, Piscataway, NJ, USA, Jun. 1, 2007, pp. 1-8.

Xingyong LV et al: "Real-Time Dehazing for Image and Video",Computer Graphics and Applications (PG), 2010 18th Pacific Conference on, IEEE, Piscataway, NJ, USA, Sep. 25, 2010, pp. 62-69.

J Iawan Zhang et al: "Video dehazing with spatial and temporal coherence", The Visual Computer ; International Journal of Computer Graphics, Springer, Berlin, DE, vol. 1. 27, No. 6-8, Apr. 20, 2011, pp. 749-757.

Kristofor Gibson et al: "An investigation in dehazing compressed images and video", OCEANS 2010, IEEE, Piscataway, NJ, USA, Sep. 20, 2010, pp. 1-8.

Yoav Y Schechner et al: "Regularized Dehazing", CCIT Report #551, Aug. 1, 2005, pp. 1-35, Haifa, Israel URL:webee.technion.ac.il/publication-link/ index/id/353.

International Search Report dated Aug. 22, 2012 for related PCT application No. PCT/IN2012/000077.

* cited by examiner

METHOD AND SYSTEM FOR REMOVAL OF FOG, MIST, OR HAZE FROM IMAGES AND VIDEOS

FIELD OF THE INVENTION

The present invention relates to a method of removing fog from the images as well as videos independent of the density or amount of the fog and free of user intervention and also to a system for carrying out such method of fog removal from images and videos. More particularly, the present invention is directed to said method and system for removing fog from images and video involving airlight estimation and airlight map refinement based restoration of foggy images and videos. Advantageously, removal of fog from images and videos of this invention would require less execution time and yet achieve high perceptual image quality with reduced noise and enhanced contrast. The method and the system for carrying out the same would be effective even in case of deep fog and enable real-time implementation of fog removal along with video encoding or decoding and thus be user friendly and supposed to have wide application and use.

BACKGROUND OF THE INVENTION

Poor visibility degrades the perceptual image quality as well as the performance of the computer vision algorithms such as surveillance, object detection, tracking and segmentation. Poor visibility in bad weather such as fog, mist and haze caused by the water droplets present in the air. These droplets are very small (1-10 μm)[K. Garg and S. K. Nayar, \Vision and Rain", International Journal of Computer Vision, Vol. 75, No. 1, pp. 3-27, 2007.] and steadily float in the air. Due to the presence of fog, mist and haze light scattered in the atmosphere before it reaches the camera. Here onwards the word fog will be used for all fog, mist, and haze. Two fundamental scattering phenomena which cause the scattering are attenuation and airlight. A light beam travels from a scene point through the atmosphere, it gets attenuated due to the scattering by the atmospheric particles, this phenomena is called attenuation which reduces the contrast in the scene. Light coming from the source is scattered towards the camera and leads to the shift in color. This phenomena is called airlight. Airlight increases with the distance from the object. It is noted that the fog effect is the function of the distance between the camera and the object. Hence removal of fog requires the estimation of the depth map or the airlight map. If input is only a single foggy image then estimation of the depth map is under constrained. Generally estimation of depth requires two images. Therefore many methods have been proposed which use multiple images. Schechner et al [Y. Y. Schechner, S. G. Narasimhan, and S. K. Nayar, \Instant dehazing of images using polarization", IEEE Computer Society Conference on Computer Vision and Pattern Recognition, pp. 325-332, 2001.] proposed a method based on polarization. This method removes the fog through two or more images taken with different degrees of polarization. But this method can not be applied on existing databases. In past few years many algorithms have been proposed for the removal of fog which use single image.

Fattal [R. Fattal, \Single image dehazing", International Conference on Computer Graphics and Interactive Techniques archive ACM SIGGRAPH, pp. 1-9, 2008.] proposed a method which is based on the independent component analysis (ICA). This method estimates the optical transmission in hazy scenes. Based on this estimation, the scattered light is eliminated to increase scene visibility and recover haze from scene contrasts. Here restoration is based on the color information, hence this method can not be applied for the gray image. This method fails when there is dense fog because dense fog is often colorless.

Tan [R. T. Tan, \Visibility in bad weather from a single image", IEEE conference on Computer Vision and Pattern Recognition, pp. 1-8, 2008.] proposed a method based on spatial regularization from a single color or gray scale image. Tan removed the fog by maximizing the local contrast of the image but restored image looks over saturated.

Kopf et al [J. Kopf, B. Neubert, B. Chen, M. Cohen, D. Cohen-Or, O. Deussen, M. Uyttendaele, and D. Lischinski, \Deep photo: Model-based photograph enhancement and viewing", ACM Transactions on Graphics, Vol. 27, No. 5, pp. 116:1-116:10, 2008.] proposed a method based on the use of a 3D model of the scene. This method is application dependent and requires the interactions with an expert.

He et al [K. He, J. Sun, and X. Tang, \Single image haze removal using dark channel prior", IEEE International Conference on Computer Vision and Pattern Recognition, pp. 1956-1963, 2009.] proposed a method based on the matting and dark channel prior from a single color or gray scale image. But when the scene objects are bright similar to the atmospheric light, underlying assumptions of this algorithm do not remain valid. Tarel et al [J. P. Tarel and N. Hautiere, \Fast visibility restoration from a single color or gray level image", IEEE International Conference on Computer Vision, pp. 2201-2208, 2009.] proposed a fast visibility restoration algorithm. This method assumes the airlight as a percentage between the local standard deviation and the local mean of the whiteness. This method based on linear operations but requires many parameters for the adjustment for optimal result.

It is thus evident that there exist systems to remove fog from images captured by multiple cameras viz. stereoscopic imaging and there are also systems that do the same job using only one camera. However, no existing system attempted to remove fog from videos. The present invention involves a system and method using single camera approach for removing fog from images as well as videos which save cost and computation.

OBJECTS OF THE INVENTION

It is thus the basic object of the present invention to provide for technical advancement in the field of removing fog from the images as well as videos for enhancing the perceptual image quality involving airlight estimation technique which would be user friendly and would not require any user intervention.

A further object of the present invention is directed to providing for a method and system of removing fog effects from the images and/or videos which would effectively improve perceptual image quality for both RGB and gray image/video.

Another object of the present invention is directed to for a method and system of removing fog effects from the images and/or videos which would be adapted for RGB Colour model and advantageously also for HIS colour model involving reduced computational requirements.

A still further object of the present invention is directed to providing for a method and system of removing fog effects from the images and videos which can efficiently improve perceptual image quality even in conditions of dense fog.

A still further object of the present invention is directed to providing a method and system of removing fog effects from the images and/or videos which would provide for the much required flexibility to focus on the restoration quality at a particular depth and can be effectively applied for restoration of images which are not degraded by fog.

A still further object of the present invention is directed to providing a method and system of removing fog effects from the images and/or videos adapted to limit noise while enhancing contrast.

A still further object of the present invention is directed to providing a method and system of removing fog effects from the images and/or videos which would be simple, cost-effective and advantageously involve high perceptual image quality.

A further object of the present invention is directed to providing for a method and system for fog removal from images and/or videos which would aid the performance of various computer vision algorithms especially those which use feature information such as object detection, tracking, segmentation and recognition.

Yet another object of the present invention is directed to a method and system for fog removal from images and/or videos which could be implemented for various hand held embedded systems.

Another object of the present invention is directed to a method and system for fog removal from images and/or videos which could be advantageously implemented and provided for variety of applications such as navigational systems using visual cues, consumer electronics, entertainment industry and film post production.

SUMMARY OF THE INVENTION

The basic aspect of the present invention is thus directed to a method for removing fog from images and/or videos comprising of:
  (a) carrying out histogram equalization whereby the foggy image is equalized to increase the contrast;
  (b) providing an airlight map of the foggy image/video;
  (c) Refining the airlight map involving anisotropic diffusion and/or bilateral filtering; and
  (d) Restoring the foggy image based on said refined airlight map and optionally, when the restored image is having low contrast, if required, performing histogram stretching of the restored image.

In the above method for removing fog from images and/or videos the said images and/or videos include multi component colour images/videos including RGB, HSI images/videos and/or single component including gray images/videos.

A further aspect of the present invention is directed to a method for removing fog from images/videos wherein after airlight map A is estimated, carrying out restoration of each color component of de-foggy image following:

$$I_0(x, y, c) = \frac{(I(x, y, c) - A)}{\left(1 - \frac{A}{I_\infty(c)}\right)^q}$$

wherein $c \in (r, g, b)$, $I_0(x,y,c)$ is image intensity in absence of fog, $I(x,y,c)$ is observed image intensity at pixel $(x,y)$ and $I_\infty(c)$ is global atmospheric constant or sky intensity, factor $q=k_1/k_2$ emphasize the restoration at particular depth and $k_1$, $k_2$ are extinction co-efficients.

A still further aspect of the present invention is directed to said method for removing fog from images/videos wherein after airlight map A is estimated, since fog has no effect on the hue, carrying out restoration based on HSI (Hue, Saturation and Intensity) colour model involving processing carried out only over the saturation and intensity plane with reduced computation following:

$$S_{I_0} = 1 - \frac{(1 - S_I)\left[1 - \frac{A(x, y)}{\min(I(x, y))}\right]}{\left[1 - \frac{A(x, y)}{I_{int}(x, y)}\right]}$$

where $S_{I_0}$ is saturation in absence of fog and $S_I$ is saturation of foggy image, $A(x,y)$ is the airlight at pixel $(x,y)$, $\min(I(x,y))$ is the minimum image intensity of foggy image at pixel $(x,y)$, $I_{int}(x,y)$ is the intensity component (average of R, G and B) of a colour vector $I(x,y)$ representing [R,G,B].

A still further aspect of the present invention is directed to said method for removing fog from images/videos wherein said airlight map is estimated iteratively involving anisotropic diffusion or non iterative bilateral filter.

Yet another aspect of the present invention is directed to said method for removing fog from images/videos wherein said airlight estimation involving anisotropic diffusion or bilateral filter is carried out perform the smoothing of the intra region and edges remain stable over a very long time whereby diffusion and edge detection is done under a single process adapted to reduce the diffusivity at those locations which have a larger likelihood to be edges.

A still further aspect of the present invention is directed to said method for removing fog from images/videos wherein said foggy image estimated airlight map depends upon the distance of the scene points from the camera.

According to yet another aspect of the present invention is directed to said method for removing fog from images/videos comprising flexibility to focus on the quality of the image at required depth involving said factor 'q' adapted to control the visual quality of restored image such that for lower value of $q(q<1)$, objects in lower depth are more enhanced, and on the other hand for higher value of $q(q>1)$, the images at further end are more enhanced.

Importantly, also in said method for removing fog from images/videos involves different extinction co-efficients ($k_1$ & $k_2$) for attenuation and airlight.

A further aspect of the present invention is directed to said method for removing fog from videos comprising involving temporal redundancy, wherein I frame is spatially encoded and P frame is temporally coded, said temporal coding carried out using motion vectors.

Yet another aspect of the present invention is directed to said method for removing fog from videos wherein the airlight for the I frame is estimated by suitable methods including the anisotropic diffusion and airlight of the P frame is essentially estimated using previously calculated motion vectors.

A further aspect of the present invention is directed to a method for removing fog from videos as above comprising step of regularizing motion vectors for inaccuracies stemming from 3D to 2D mapping of real motion, finite aperture, motion discontinuities and temporal discontinuities.

Another aspect of the present invention is directed to a method for removing fog from videos as above wherein for faster computation when the frame rate is high and the relative motion between the scene and camera is low, the temporal correlation between constitutive frames is high, the airlight map of the previous frame is used as an estimate of the airlight of the frame under consideration.

According to a further aspect of the present invention is directed to a system for removing fog from images/videos for implementation of the method as described above comprising of:
- (a) means for carrying out histogram equalization whereby the foggy image is equalized to increase the contrast;
- (b) means for generating said airtight map of the foggy image;
- (c) means adapted for refining the airlight map involving anisotropic diffusion and/or bilateral filtering; and
- (d) means for restoring the foggy image based on said refined airlight map and, optionally, if required, when the restored image is having low contrast adapted to perform histogram stretching of the restored image.

The invention is further discussed hereunder in greater detail in relation to the following non-limiting exemplary illustrations as per the following accompanying figures:

BRIEF DESCRIPTION OF THE ACCOMPANYING FIGURES

FIG. 1: is the schematic Block diagram of the proposed fog removal method for images.

Figure 2:
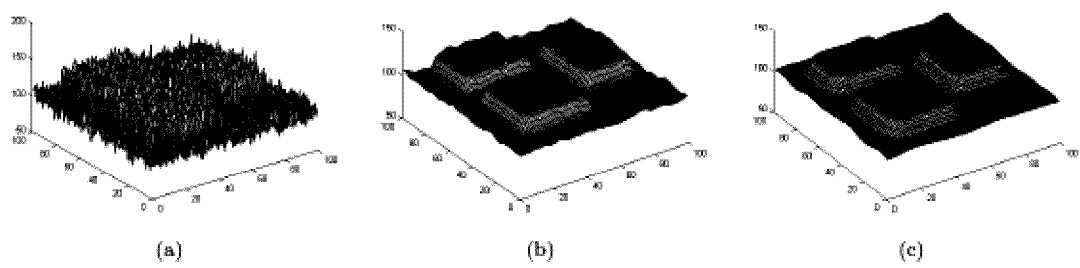

FIG. 2: show the surface plot of the brightness (a) before, (b) after the anisotropic diffusion and (c) after the bilateral filtering.

Figure 3:
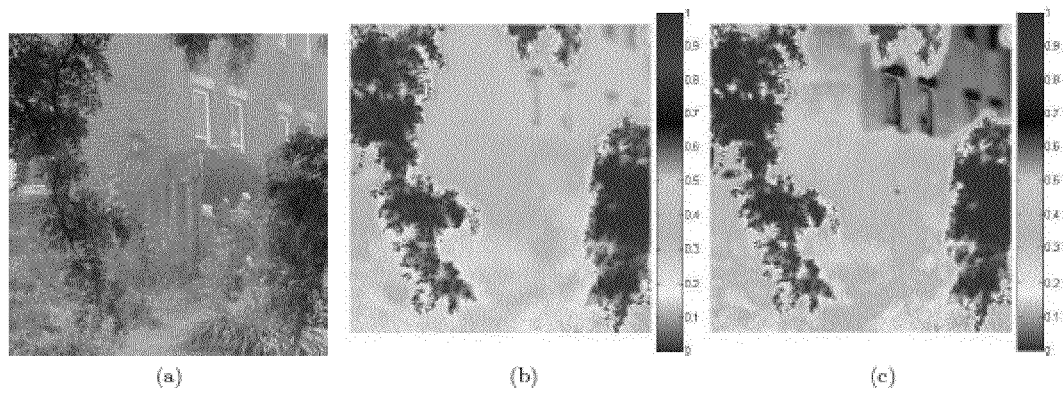

FIG. 3: shows airtight map estimation (a) original foggy image, corresponding airtight map using (b) anisotropic diffusion and (c) bilateral filtering.

Figure 4:
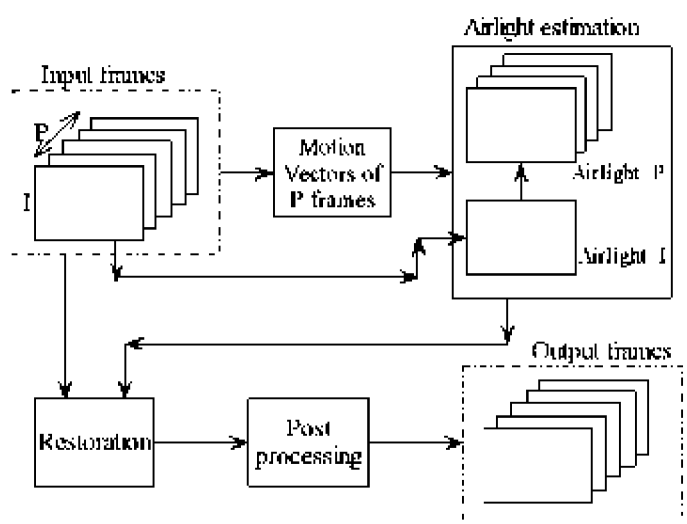

FIG. 4: is the schematic Block diagram of the proposed fog removal algorithm for the videos.

Figure 5:
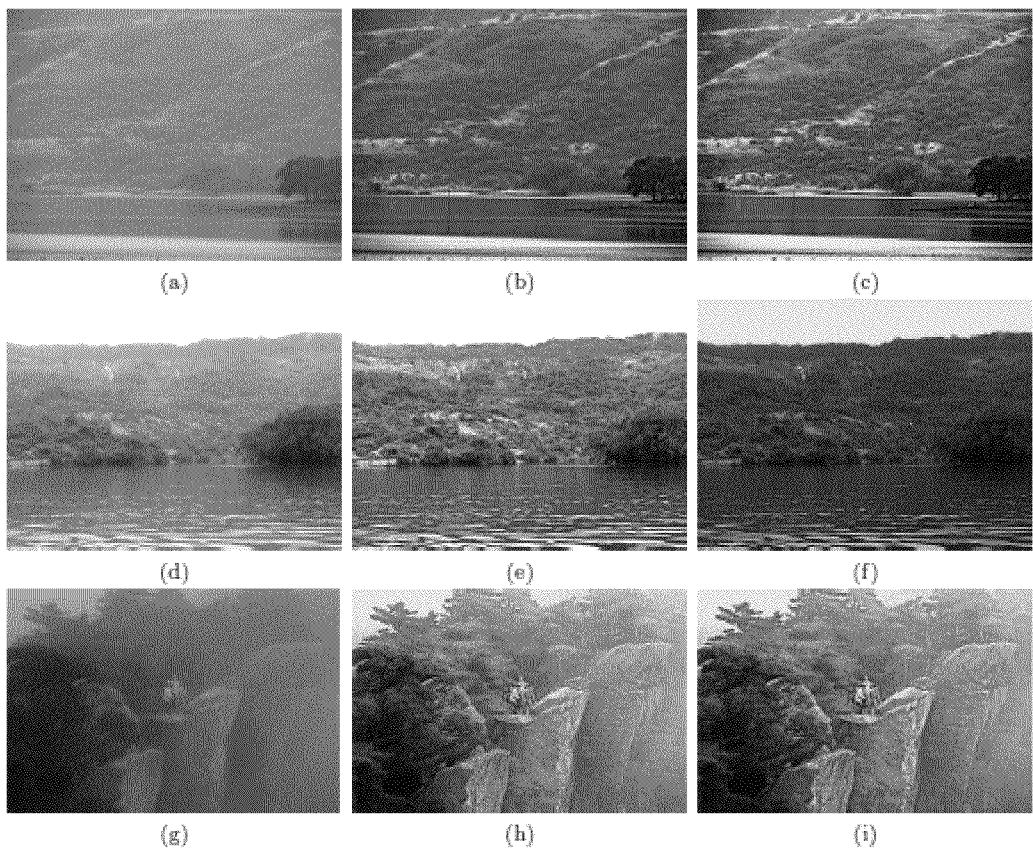

FIG. 5: is the images of (a) Original foggy 'lonavala 01' image, (b) restored 'lonavala 01' image by the proposed 1 algorithm, (c) restored 'lonavala 01' image by the proposed 2 algorithm; (d) Original foggy 'lonavala02' image (e) restored 'lonavala02' image by the proposed 1 algorithm, (f) 'restored lonavala02' image by the proposed 2 algorithm, (g) Original foggy 'yellow mountain' image, (h) restored 'yellow mountain' image by the proposed 1 algorithm, (i) restored ' yellow mountain' image by the proposed 2 algorithm.

Figure 6:
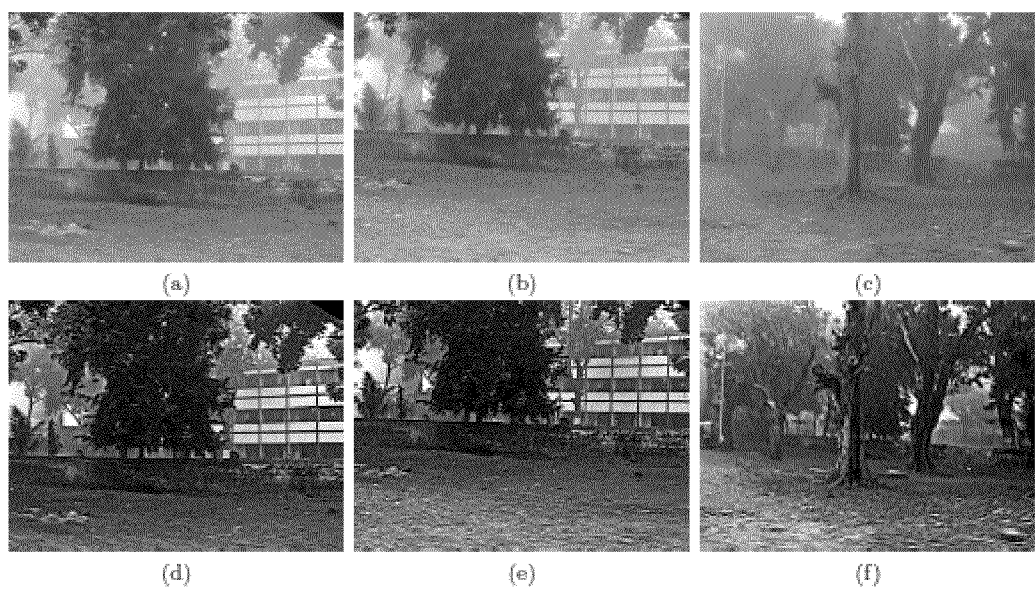

FIG. 6: (a)-(c) 3 frames of 'fogiitcampus01' video, & (d)-(f) removal of fog in corresponding above frames by proposed 1 algorithm.

DETAILED DESCRIPTION OF THE INVENTION WITH REFERENCE TO THE ACCOMPANYING DRAWINGS

The present invention is directed to an efficient fog removal method and system especially for the effective removal of fog from images and/or video taking care of the effect of both the scattering phenomena; airtight and attenuation. Importantly, the present invention addresses the issue of fog removal from images and/or video involving advancement in the estimation of airtight in a frame following either anisotropic diffusion or bilateral filtering. For P/B frames the airtight estimate can be derived from reference frames. Proposed method of the invention can be applied for the RGB and gray scale images/videos. The method and the system for carrying out the same is effective even in the case of dense fog. The invention is adapted to achieve significant improvement in the enhancement of the foggy images in less time and is directed to pave the way for real-time implementation of fog removal along with video encoding or decoding. The system and method of the invention involves a single camera approach to remove fog from images and also for the first time to remove fog from videos and enhancing perceptual image quality using temporal redundancy characteristics of videos. The system and method of the invention can be advantageously used for the HSI color space. Use of the HSI color space helps to reduce the complexity further and maintains the color fidelity.

In accordance with the present invention, fog attenuation is represented as $$I_{att}(x,y) = I_0(x,y) e^{-k_1 d(x,y)} \quad (1)$$

where, $I_{att}(x,y)$ is the attenuated image intensity (gray level or RGB) at pixel (x; y) in presence of fog and $I_0(x,y)$ is the image intensity in absence of fog. $k_1$ is the extinction coefficient and d(x; y) is the distance of the scene point from the viewer or camera.

Airlight is represented as $$A(x,y) = I_\infty (1 - e^{-k_2 d(x,y)}) \quad (2)$$

where $I_\infty$ is the global atmospheric constant. It is also called sky intensity. $K_2$ is the extinction coefficient. Hence according to the Koschmieder's law, the effect of fog on pixel intensity is represented as $$I(x,y) = I_{att}(x,y) + A(x,y) \quad (3)$$

where, I(x; y) is the observed image intensity at pixel (x; y).

$$I(x,y) = I_0(x,y) e^{-k_1 d(x,y)} + I_\infty (1 - e^{-k_2 d(x,y)}) \quad (4)$$

wherein the right hand side first term is the direct attenuation and second term is the airlight.

According to Equation (2)

$$e^{-d(x,y)} = \left(1 - \frac{A}{I_\infty}\right)^{\frac{1}{k_2}} \quad (5)$$

Thus, $$I(x, y) = I_0(x, y)\left(1 - \frac{A}{I_\infty}\right)^{\frac{k_1}{k_2}} + A \quad (6)$$

$$I(x, y) = I_0(x, y)\left(1 - \frac{A}{I_\infty}\right)^{q} + A \quad (7)$$

where $q = k_1/k_2$, in general q=1 i.e. $k_1 = k_2$; the factor q can emphasize the restoration at particular depth.

The airlight depend on the depth of the scene. Airlight is also dependent upon various assumptions of the underlying estimation procedure. Thus the method according to the present invention suggests different extinction co-efficients ($k_1$ & $k_2$) for attenuation and airlight in Koschmieder law which gives more flexibility to emphasize different depth at the time of restoration and to handle different situations. Different objects may be at different distance from camera and thus airlight should be different for different objects. Also it must be smooth for an object except along edges. Airlight map undergo intra-region smoothing preferentially over inter-region smoothing. Thus diffusion takes place in the interior region without affecting the region boundary.

Accompanying FIG. 1 schematically illustrates the method of the present invention with a representative block diagram wherein the details of each blocks are as follows:

Histogram Equalization:
First the foggy image is equalized to increase the contrast.
Initial Estimation of Airlight:
To restore the foggy image, there is a requirement of the airlight map of the foggy image. Here initial estimation of airlight map is based on the dark channel prior.

Airlight Map Refinement:

Proposed techniques estimate the airtight map by the anisotropic diffusion and bilateral filtering. Proposed technique with anisotropic diffusion is proposed 1 algorithm and proposed technique with bilateral filter is proposed 2 algorithm. Generated airlight map preserves the edges and performs the smoothing over the object region. The procedure can be applied for the RGB and gray scale images and is effective even in the case of dense fog.

Airlight Map Estimation Using Anisotropic Diffusion:

Anisotropic diffusion can be represented as.

$$\frac{\partial A}{\partial t} = div(\alpha(x, y, t)\nabla A) = \alpha(x, y, t)\Delta A + \nabla \alpha \cdot \nabla A \quad (8)$$

where div is the divergence operator and $\alpha$ is the conduction coefficient. $\nabla$ and $\Delta$ are the gradient and Laplacian operators respectively. If $\alpha$ (x,y,t) is constant over time then equation (8) reduces to heat diffusion equation $$\frac{\partial A}{\partial t} = \alpha \Delta A \quad (9)$$

Heat equation describes the distribution of heat in a region over time. Heat equation states that if a body is kept inside the box of cold water, how the temperature of the body will decrease and finally attain the temperature of the surrounding water. To encourage the smoothing within a region instead of the smoothing across the edges, $\alpha$ should be 1 in the interior region and 0 at the edges. Hence if E(x,y,t) is the estimation of the boundaries, then according to Perona-Malik equation the conduction coefficient should be chosen as $$\alpha = g(\|E\|) \quad (10)$$

where g(.) is a nonnegative monotonically decreasing function with g(0)=1. Thus diffusion take place in the interior region without affecting the region boundaries.

Here g(.) is assumed as $$g(\|E\|) = e^{-\left(\frac{\|E\|}{k}\right)^2} \quad (11)$$

where k is a constant which is fixed. Hence according to equation (9) airlight map can be estimated iteratively as follows $$A_{t+1} = A_t + \lambda [\alpha \Delta A_t] \quad (12)$$

where $\lambda(0<\lambda<1)$ is a smoothing parameter.

Air Light Map Estimation Using Bilateral Filter:

The bilateral filter is intuitively developed as a noniterative alternative to anisotropic diffusion, achieving satisfying results with a single iteration. The discrete version of the kernel of a bilateral filter can be expressed as $$A(x) = \frac{\sum_{\xi \in \eta_x} w(\xi - x) c(A_0(\xi) - A_0(x)) A_0(\xi)}{\sum_{\xi \in \eta_x} w(\xi - x) c(A_0(\xi) - A_0(x))}. \quad (13)$$

Where $\xi$ the pixel position, A(x) is the estimate of the current pixel $A_0(x)$, $\eta_x$ represents the neighborhood of x (where $\xi$ is a member of that neighborhood), w(x) and c(x) are the spatial domain and intensity domain kernels, respectively.

The kernel w(x) basically averages the neighboring pixel intensity values with decreasing weights for pixels at larger distances. The kernel c(x) takes into account the intensity differences between the center pixel and its neighboring pixel; the larger the pixel value difference is, the smaller the pixels contribution is during smoothing. In this way, a pixel is simply replaced by the weighted mean of its neighbors.

Initial Estimation of $A_0$

Implementation of equations (12) and equation (13) require the initial estimation of the $A_0$. It is known that airtight map A is a scalar image which is always positive, hence $A_0>0$. Taking minimal component of equation (7)

$$\min_{\alpha \in (r, g, b)} (I^c(x, y)) = \min_{\alpha(r, g, b)} \left[I_0^c(x, y)\left(1 - \frac{A}{I_\infty}\right)\right] + A$$

$$\min_{\alpha \in (r, g, b)} (I^c(x, y)) - \min_{\alpha(r, g, b)} \left[I_0^c(x, y)\left(1 - \frac{A}{I_\infty}\right)\right] = A$$

According to dark channel prior, dark channel is denoted as the minimum intensity across the red, blue and green channels. Natural outdoor images are usually full of shadows and colourful objects (viz green grass, trees, red or yellow plants and blue water surface). Thus dark channels of these images are really dark. For the fog free image except for the sky region, intensity of the dark channel is low and tends to be zero.

Hence $$\min_{\alpha \in (r, g, b)} (I_0^c(x, y)) \approx 0$$

and

Positive. Thus $$\min_{\alpha \in (r, g, b)} (I^c(x, y)) \geq A > 0 \quad (14)$$

Thus initial estimate of $A_0$ can be assumed as $$A_0 = \beta \min_{\alpha \in (r, g, b)} (I^c(x, y)) \quad (15)$$

where $\beta$ is a constant and $0<\beta<1$. If the input image is the gray scale image then initial estimation of the $A_0$ can be assumed as $$A_0 = \beta I(x, y) \quad (16)$$

Thus it is evident from the above methodology for the airtight estimate that anisotropic diffusion and bilateral filter perform the smoothing of the intra region and edges remain stable over a very long time which is illustrated in the accompanying FIG. 3. These results look very impressive. It is due to the fact that instead of considering the diffusion and edge detection as two independent process, here both process interact in one single process. Here an inhomogeneous process is applied that reduce the diffusivity at those locations which have a larger likelihood to be edges. Airlight map estimation for the real foggy image is shown in the accompanying FIG. 4. It is observed that in foggy image estimated airlight map depends upon the distance of the scene points from the camera. Estimated airtight map is able to capture the discontinuities across the edges and smoothing over the objects.
Restoration:
Once airtight map A is estimated then each color component of de-foggy image can be restored as
where C∈(r,g,b)

$$I_0(x, y, c) = \frac{(I(x, y, c) - A)}{\left(1 - \frac{A}{I_\infty(c)}\right)^q} \quad (17)$$

The initial estimation of airlight is based on the minimum channel prior denoted as the minimum intensity across the red, blue and green channels and which is not the exact one. Bilateral filtering and Anisotropic diffusion also introduce some error in the approximation of airlight map. To reduce this error effect, the present invention introduced the factor 'q' (i.e. $k_1/k_2$). This factor 'q' controls the visual quality of restored image.

The above factor q control the visual quality of the restored image. It is possible following the findings under the present invention that factor q control the restoration process. For lower value of q(q<1), objects in lower depth are more enhanced, and on the other hand for higher value of q(q>1), the images at further end are more enhanced. This gives a flexibility to focus on the quality of the image at the required depth.

It is known that color image can also be represented in more perceptually relevant HSI (Hue, Saturation, and intensity) color space. Hue is a color attribute that describes a pure color, whereas saturation gives a measure of the degree to which a pure color is diluted by white light. This color space decouples the intensity component from the color carrying information (hue and saturation) in a color image. It is observed that fog has no effect on the hue of scene. Other two components saturation and intensity are affected by fog. Hence to restore a foggy image, processing is needed only over the saturation and intensity plane. Thus unlike RGB color space, computation is reduced by ⅓ in HSI color space.

Post Processing:
Restored image may have low contrast. Thus there is a requirement of some post processing. This post processing step is optional and required only when restored image has low contrast. To increase the contrast, histogram stretching of the restored image is performed.

Extension to Videos:
Temporal redundancy removal is an essential step of any video coding standard viz. MPEG. Above fog removal procedure can be extended to videos with the use of the temporal redundancy, wherein I frame is spatially encoded and P frame is temporally coded. Temporal coding is achieved using motion vectors. The airlight for the I frame is estimated by the anisotropic diffusion and airlight of the P frame is estimated using previously calculated motion vectors. While alternative methods other than anisotropic diffusion to estimate airlight of I frame is possible to be adopted, estimation of airlight for P frame is essentially carried out using motion vectors according to the present invention. Accompanying FIG. 2 illustrate the proposed fog removal procedure extended to videos.

The method according to the present invention is also capable of enhancing non-foggy images without producing any degradation in the visual quality.

In order to evaluate the performance, contrast gain ($C_{gain}$) and percentage of number of saturated pixels (σ) are calculated and compared with existing techniques. Contrast gain is the difference of mean contrast of the enhanced image and the mean contrast of the original image plagued by the fog. The contrast gain value should be positive and greater is the value of the contrast gain, stronger is the resulting contrast enhancement. Contrast gain should not be so high that the pixels of the output image become over saturated. On the other hand, a low value of σ indicates the better performance of the method of the present invention.

Simulation of the method of fog removal according to the present invention is carried out in various foggy images and videos. Results of the simulation for images are illustrated in the accompanying FIG. 5 and the results of simulation for the videos are illustrated in accompanying FIG. 6. Accompanying FIG. 3 shows the images of (a) Original foggy 'lonavala 01' image, (b) restored 'lonavala 01' image by the proposed 1 algorithm, (c) restored 'lonavala 01' image by the proposed 2 algorithm; (d) Original foggy 'lonavala02' image (e) restored 'lonavala02' image by the proposed 1 algorithm, (f) restored 'lonavala02' image by the proposed 2 algorithm, (g) Original foggy 'yellow mountain' image, (h) restored 'yellow mountain' image by the proposed 1 algorithm, (i) restored 'yellow mountain' image by the proposed 2 algorithm. Accompanying FIG. 4 shows the images (a)-(c) 3 frames of 'fogiitcampus01' video, & (d)-(f) removal of fog in corresponding above frames by proposed 1 algorithm.

Results show that the proposed method is capable to restore the images/videos with substantially enhanced perceptual quality. It is observed that as regards the fog removal technique followed as per the present invention, anisotropic diffusion is superior in terms of restoration quality and speed compared to the bilateral filtering and similar other techniques known in the art.

The present invention thus provide for the desired above method of removal of fog from the images and/or videos constitutes an advancement in the related art and the advantages derived include:
  (a) capable of removing fog from images as well as videos;
  (b) can be applied to any existing fog removal technique for enabling fog removal of videos.
  (c) Can be applied for both color as well as gray images/videos.
  (d) Can be applied for pre processing and post processing of video.
  (e) Can provide the desired flexibility to focus on the restoration quality at a particular depth.
  (f) Can be used for HSI color space too, which maintains color fidelity and reduces the computation in great extent.
  (g) Can be applied also for restoration of images which are not degraded by fog.
  (h) Can improve the performance of various computer vision algorithms which use feature information such as object detection, tracking, segmentation and recognition.
  (i) Is found to be suitable for real time application for handheld embedded system.
  (j) Has the potential for application in navigation systems using visual cues, consumer electronics, entertainment industries and film post production.

We claim:
1. A method for removing fog from images and/or videos comprising:
  (a) carrying out a histogram equalization such that a foggy image is equalized to increase contrast;
  (b) estimating an airlight map by providing an initial airlight map A of the foggy image and/or video, the esti- mation is based on minimum intensity across red, green and blue channel of observed image intensity at pixel (x,y) and refining the airlight map A involving anisotropic diffusion or bilateral filtering;
(c) restoring the foggy image based on the refined airlight map A by carrying out restoration of each color component of de-foggy image involving $$I_0(x, y, c) = \frac{(I(x, y, c) - A)}{\left(1 - \frac{A}{I_\infty(c)}\right)^q}$$

based on the refined airlight map involving a restoration process having wherein c∈(r,g,b), $I_0(x,y,c)$ is image intensity in absence of the fog, I(x,y,c) is the observed image intensity at the pixel (x,y) and $I_\alpha(c)$ is global atmospheric constant or sky intensity, $q=k_1/k_2$, $k_1$ is extinction co-efficient for attenuation, $k_2$ is extinction co-efficient for the airlight, with said involvement of k1 and k2 providing flexibility to focus on quality of the image at a required depth by involving different extinction co-efficient for the attenuation and the airlight in factor q to favour control of visual quality of the restored image whereby for a lower value of the factor q(q<1), objects in at a lower depth are more enhanced, and for a higher value of the factor q(q>1), the images at a further end are more enhanced, and performing a histogram stretching of the restored image if the restored image has low contrast.

2. The method for removing fog from images and/or videos according to claim 1, wherein the images and/or videos include multi component color images and/or videos and/or single component color images, wherein the multi component color images and/or videos includes RGB and Hue, Saturation and Intensity (HSI) images and/or videos, and wherein the single component color images and/or videos include grayscale images and/or videos.

3. The method for removing fog from images and/or videos according to claim 1, wherein after refined airlight map A is estimated, since fog has no effect on the hue, carrying out restoration based on a HSI color model involving processing carried out only over the saturation and intensity plane with reduced computation following:

$$S_{I_0} = 1 - \frac{(1 - S_I)\left[1 - \frac{A(x, y)}{\min(I(x, y))}\right]}{\left[1 - \frac{A(x, y)}{I_{int}(x, y)}\right]}$$

where SI0 is saturation in absence of fog and SI is saturation of the foggy image, A(x,y) is the airlight at pixel (x,y), min(I (x,y)) is the minimum image intensity of the foggy image at pixel (x,y), Iint(x,y) is the intensity component (average of R, G and B) of a color vector I(x,y) representing [R,G,B].

4. The method for removing fog from images and/or videos according to claim 1, wherein said the airlight map is estimated iteratively involving anisotropic diffusion or non iterative bilateral filter.

5. The method for removing fog from images and/or videos according to claim 4, wherein said the refined airlight estimation involving anisotropic diffusion or bilateral filter is carried out perform the smoothing of the intra region and edges remain stable over a very long time whereby diffusion and edge detection is done under a single process adapted to reduce the diffusivity at those locations which have a larger likelihood to be edges.

6. The method for removing fog from images and/or videos according to claim 1, wherein said the foggy image estimated refined airlight map depends upon the distance of the scene points from the a camera.

7. The method for removing fog from images and/or videos according to claim 1 comprising involving temporal redundancy, wherein I frame is spatially encoded and P and/or B frame is temporally coded, the temporal coding carried out using motion vectors.

8. The method for removing fog from images and/or videos according to claim 7, wherein the airlight for the I frame is estimated by one or more suitable methods including the anisotropic diffusion and airlight of the P and/or B frame is essentially estimated using previously calculated motion vectors and the airlight estimate(s) of the reference frame(s).

9. The method for removing fog from images and/or videos according to claim 7, comprising step of regularizing motion vectors for inaccuracies stemming from 3D to 2D mapping of real motion, finite aperture, motion discontinuities and temporal discontinuities.

10. The method for removing fog from images and/or videos according to claim 7, wherein for faster computation, when the frame rate is high and the relative motion between the scene and camera is low, the temporal correlation between constitutive frames is high, the airlight map of the previous frame is used as an estimate of the airlight of the frame under consideration.

11. A system for removing fog from images and/or videos according to the method as claimed of claim 1, comprising:
(a) means for carrying out histogram equalization whereby the foggy image is equalized to increase the contrast;
(b) means for generating the initial airlight map A of the foggy image based on minimum intensity across red, green and blue channel of observed image intensity at pixel (x,y);
(c) means adapted for refining the airlight map A involving anisotropic diffusion and/or bilateral filtering; and
(d) means for restoring the foggy image based on the refined airlight map A by carrying out restoration of each color component of de-foggy image involving $$I_0(x, y, c) = \frac{(I(x, y, c) - A)}{\left(1 - \frac{A}{I_\infty(c)}\right)^q}$$

wherein c∈(r,g,b), $I_0(x,y,c)$ is image intensity in absence of the fog, I(x,y,c) is the observed image intensity at the pixel (x,y) and $I_\alpha(c)$ is global atmospheric constant or sky intensity, $q=k_1/k_2$, $k_1$ is extinction co-efficient for attenuation, $k_2$ is extinction co-efficient for the airlight, with said involvement of k1 and k2 providing flexibility to focus on quality of the image at a required depth by involving the different extinction co-efficient for the attenuation and the airlight in factor q to control visual quality of the restored image such that for a lower value of the factor q(q<1), objects in at a lower depth are more enhanced, and for a higher value of the factor q(q>1), the images at a further end are more enhanced,
and, optionally, if required, when the restored image has a low contrast adapted to perform histogram stretching of the restored image.

* * * * *